T. J. SIMS.
SPRING MOTOR.
APPLICATION FILED JUNE 16, 1917.
1,258,158.
Patented Mar. 5, 1918.
2 SHEETS—SHEET 1.
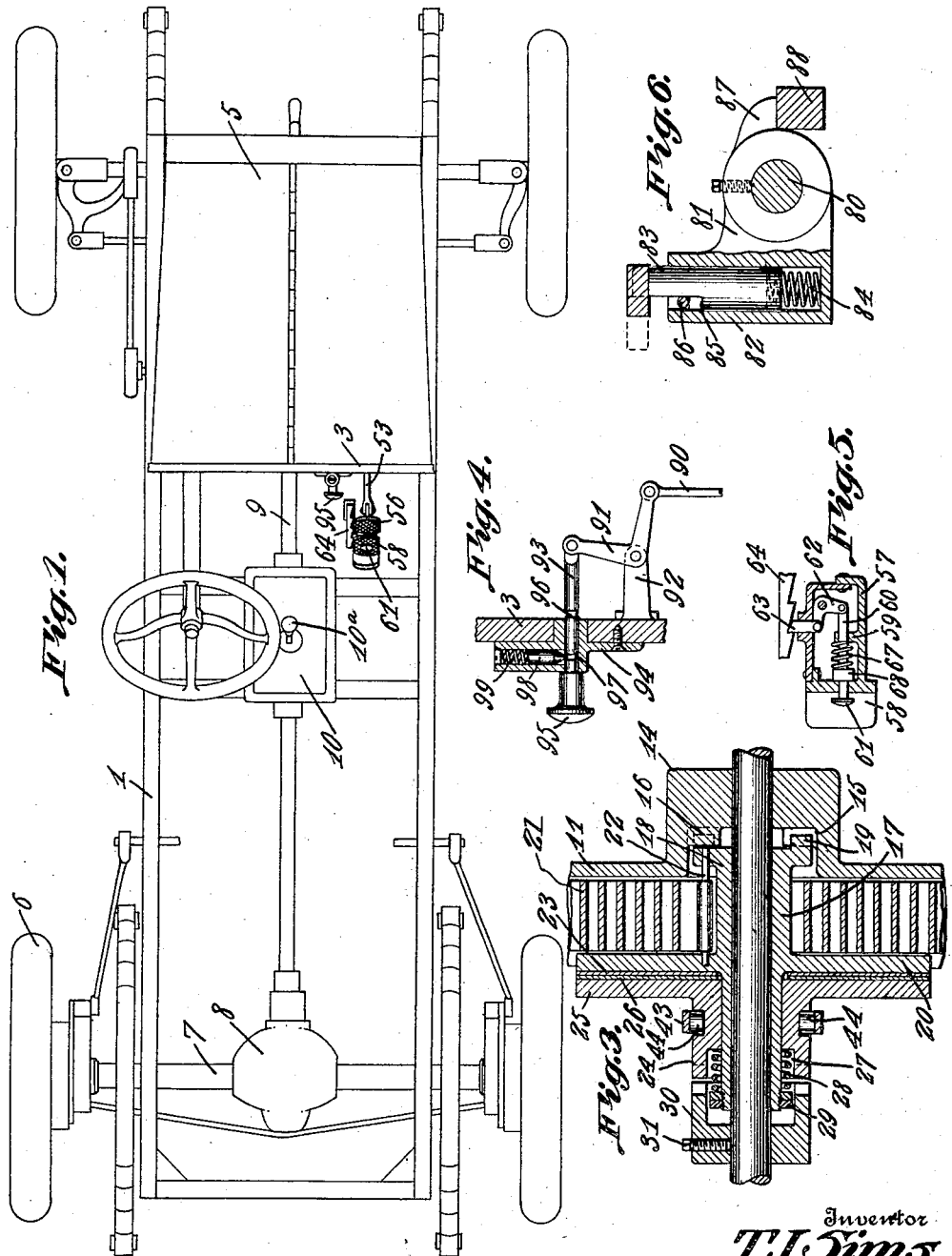
Inventor
T. J. Sims,
By C. A. Snow & Co.
Attorney
Witness
J. R. ?
H. A. Mitchell

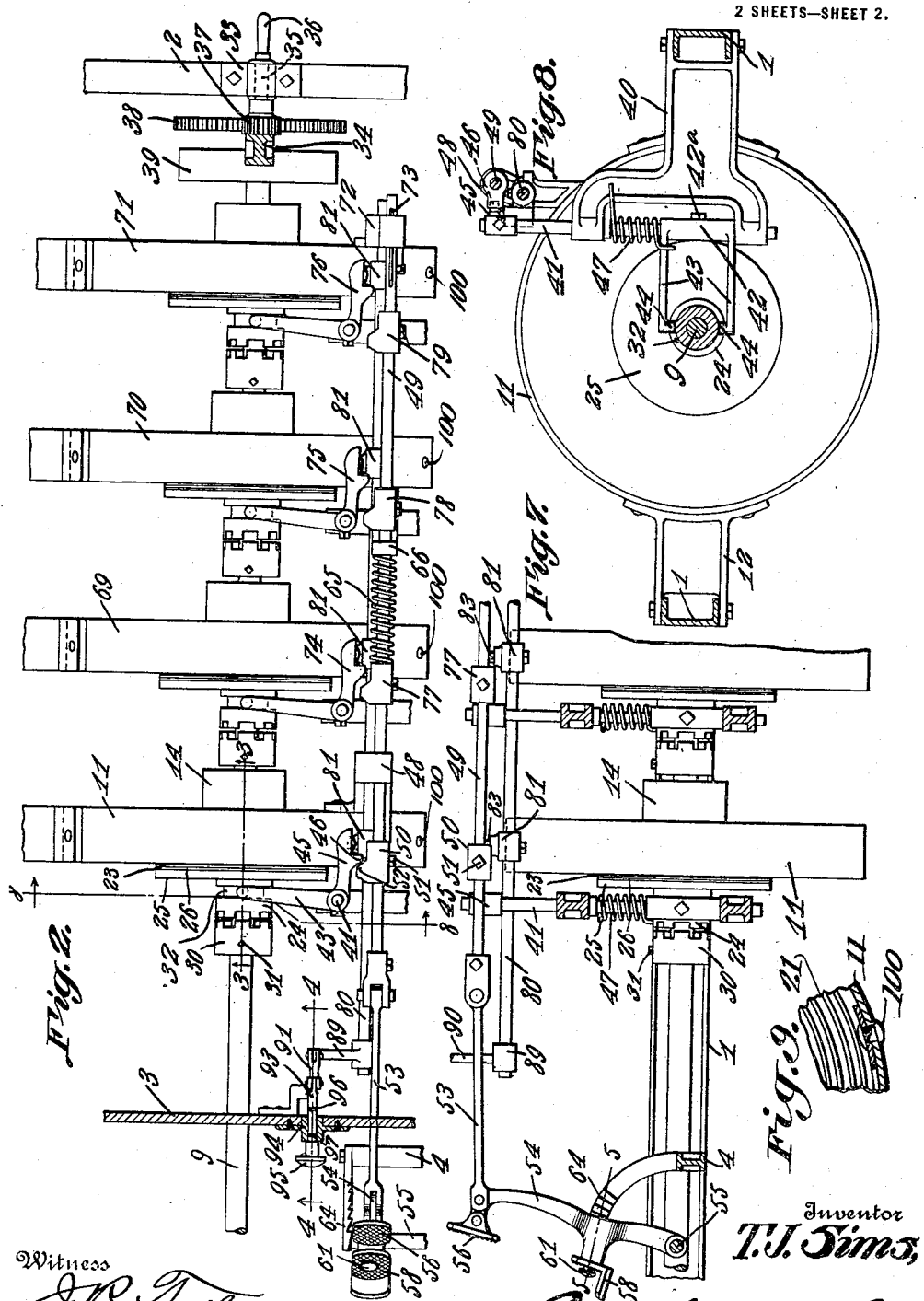

UNITED STATES PATENT OFFICE.

TAYLOR J. SIMS, OF TEAGUE, TEXAS.

SPRING-MOTOR.

1,258,158.　　　Specification of Letters Patent.　　Patented Mar. 5, 1918.

Application filed June 16, 1917. Serial No. 175,107.

*To all whom it may concern:*

Be it known that I, TAYLOR J. SIMS, a citizen of the United States, residing at Teague, in the county of Freestone and State of Texas, have invented new and useful Spring-Motors, of which the following is a specification.

The device forming the subject matter of this application is a spring propulsion for a vehicle, and one object of the invention is to provide novel means whereby one or more springs may be coupled up with a drive shaft, at the will of an operator, depending upon the amount of driving energy which it is necessary to impart to the shaft.

Another object of the invention is to provide novel means whereby, when one spring becomes exhausted, another spring may be coupled up with the shaft to actuate the same.

Another object of the invention is to provide novel means whereby the springs may be wound up either by hand power, or from a prime mover.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a motor propelled vehicle embodying the present improvements;

Fig. 2 is a fragmental longitudinal section taken through the spring driving mechanism, parts appearing in elevation;

Fig. 3 is a section taken approximately on the line 3—3 of Fig. 2;

Fig. 4 is a sectional detail taken approximately on the line 4—4 of Fig. 2;

Fig. 5 is a section taken on the line 5—5 of Fig. 7;

Fig. 6 is a cross section taken through one of the latch mechanisms;

Fig. 7 is a fragmental side elevation showing a part of the controlling mechanism;

Fig. 8 is a cross section taken approximately on the line 8—8 of Fig. 2;

Fig. 9 is a sectional detail showing the connection for one end of the spring.

In the drawings, the numeral 1 indicates the chassis of a vehicle, the same including a forward bar 2, and an intermediate bar 4. The dashboard is shown at 3 and adjacent the forward end of the vehicle there is a hood 5. The rear wheels are shown at 6 and the rear axle casing appears at 7, the numeral 8 denoting the differential. The numeral 9 marks the drive shaft whereby motion is transmitted to the rear wheels 6 as is common in automobiles. The numeral 10 denotes a transmission mechanism of any desired kind including the usual clutch and its operating means 10$^a$.

Disposed beneath the hood 5 is an annular spring casing 11 connected with the chassis 1 by means of brackets 12, the casing including a hub 14 having a recess 15 into which projects a clutch element 16 carried by the hub 14. Mounted to move endwise on the shaft 9 is a sleeve 17 having a flange 18 operating in the recess 15. The flange 18 has a clutch element 19 adapted to coact with the clutch element 16 which constitutes a part of the relatively fixed spring casing 11. The sleeve 17 surrounds the shaft 19 and the shaft 19 is journaled in the hub 14. The sleeve 17 includes a disk 20. The outer end of a coiled spring 21 is attached at 100 to the casing 11, and the inner end of the spring 21 is secured at 22 to the disk 20 and to the flange 18 which constitute a part of the sleeve 17. The disk 20 has a friction facing 23. Mounted to slide on the sleeve 17 is a clutch member 24 including a disk 25 having a friction facing 26 coöperating with the friction facing 23 of the disk 20. There is a recess 27 in the rear end of the clutch member 24 and in this recess is located a compression spring 28. The forward end of the spring 28 abuts against the clutch member 24, and the rear end of the spring 28 engages an abutment 29 on the rear end of the sleeve 17, the abutment being in the form of a pair of superposed nuts if desired. A clutch member 30 is mounted on the shaft 9 and is secured thereto by a set screw 31 or otherwise. There is a bearing 33 on the forward bar 2, and the numeral 34 denotes a bearing bracket supported in any suitable manner from the rear of the bearing 33. A shaft 35 is journaled in the bearing 33 and in the bracket 34 and may be rotated by means of a crank 36. The shaft 35 carries a small pinion 37 meshing into a larger gear wheel 38 mounted on the shaft 9. The shaft 9 may also be provided with a pulley 39.

When the clutch 10ª is thrown out, the forward end of the shaft 9 may be rotated, in order to wind up the spring 21, by hand, through a gear train comprising the crank 36, the shaft 35, the pinion 37 and the gear wheel 38, or the shaft 9 may be rotated by power, for the purpose above specified, through the instrumentality of the pulley 39. Noting Fig. 3, it will be seen that when the parts are arranged as shown in the said figure, the spring 21 cannot be wound up when the shaft 9 is rotated, provided that, as shown in the said figure, the clutch elements 19 and 16 are interengaged, it being recalled that the clutch element 16 is a part of the casing 11 and that the casing 11 is fixed to the chassis 1 by the brackets 12. If, however, the sleeve 17 be moved to the left in Fig. 3, until the clutch elements 16 and 19 are out of engagement, and until the clutch members 24 and 30 are in engagement, then, when the shaft 9 is rotated by the crank 36 or the pulley 29, the clutch member 30 will be rotated, the clutch member 24 will be rotated and, through the instrumentality of the friction facings 23 and 26, rotation will be imparted to the disk 20 and consequently to the sleeve 17, thereby winding up the spring 21. The spring 28 presses the friction facings 26 and 23 together with sufficient force so that the spring 21 can be wound up when the shaft 9 is rotated by the crank 36 or the pulley 39, and because the facings 23 and 26 are held together as aforesaid, the spring 21 can react and drive the shaft 9 when the clutch members 24 and 30 are interengaged. Now when the sleeve 17 is shifted to the left, the clutch members 30 and 24 must engage with each other before the clutch elements 19 and 16 are disengaged with each other, since otherwise, the spring 21 would unwind with a run before the clutch members 30 and 24 became interengaged—but if the vehicle is moving, and if the shaft 9 is rotating, and if the clutch elements 19 and 16 are engaged for an instant while the clutch members 24 and 30 are also engaged, something must yield during this instant, and the particular elements which do in fact permit a momentary yielding to avoid a breakage of parts, are the friction facings 26 and 23, which, under a strong and otherwise damaging strain, have relative movement upon each other.

As thus far described, the invention comprises means located adjacent the front of the vehicle, whereby the shaft 9 may be rotated to wind up the spring 21, and a suitable means, shown in Fig. 3, whereby the effort of the spring 21 may be transmitted to the shaft 9 to rotate the rear ground wheels 6.

The means for moving the clutch 24 and the sleeve 17 together longitudinally of the shaft 9, toward and away from the clutch 30, will now be described.

The numeral 40 denotes a frame carried by one of the chassis bars 1. Journaled for rocking movement in the frame 40 (see Fig. 8) is an upright shaft 41 to which is secured adjustably, as shown at 42ª, a head 42 having lateral arms 43, the movement of the shaft 41 being controlled by a spring 47 coiled around a portion of the shaft, one end of the spring bearing against the frame 40, and the other end of the spring engaging one of the arms 43. The arms 43 have projections 44 received in a circumscribing groove 32 formed in the clutch member 24. Attached to the upper end of the shaft 41 is an arm 45 which extends parallel to the shaft 9. The arm 45 has a lateral outwardly extended projection 46. There is a bearing 48 on the spring casing 11, in which an actuating member, preferably a rod 49, is mounted to slide endwise. A collar 50 is secured adjustably by means of a set screw 51 to the rod 49 and has a projection 52 coöperating with the projection 46 on the arm 45, the parts 46 and 52 being mutually inclined, so as to tilt the arm 45 and rock the shaft 41 readily, when the rod 49 is advanced or moved to the right in Fig. 2. A spring 65 surrounds a part of the rod 49, one end of the spring 65 engaging a suitable abutment 66 which may be carried by the frame of the vehicle. The other end of the spring 65 engages a collar 77 on the rod 49. The collar 77 is a duplicate of the collar 50 and will be alluded to hereinafter. The office of the spring 65 is to move the rod 49 rearwardly or toward the left in Fig. 2. The rear end of the rod 49 is pivoted to a link 53 which in its turn is pivoted to a lever 54 fulcrumed at 55 on one of the chassis bars 1. At its upper end, the lever 54 carries a toe piece 56. The lever 54 includes a casing 57 (see Fig. 5) carrying an angular heel rest 58. The casing 57 has an internal guide 59 in which a plunger 60 is mounted to reciprocate, the plunger passing through the rear end of the casing 57 and including a button 61 accessible to the heel of the operator when the heel of the operator is supported on the rest 58. The forward end of the plunger 60 is pivoted to a bell crank lever 62 fulcrumed in the casing 57, the bell crank lever being connected with a latch 63 slidable in one side of the casing 57 and adapted to coact with a rack 64 which may be supported from the intermediate bar 4. A portion of the plunger 60 is surrounded by a spring 67 which, coöperating with the guide 59 and with an abutment 68, tends to slide the plunger 60 rearwardly.

Let it be supposed that the parts are arranged as shown in Figs. 2 and 7. Then, the heel of the operator, being supported on the rest 58, advances the plunger 60 by means of the button 61, the spring 67 serving to secure a return of the plunger 60 when pressure on the button 61 is removed. When the plunger 60 is advanced in the manner above described, the bell crank lever 62 is tilted and the latch 63 is withdrawn out of engagement with the rack 64. The operator can now push the lever 54 forwardly at its upper end, this being accomplished by toe pressure exerted on the element 56. In this way, the link 53 and consequently the rod 49 will be advanced. When the rod 49 is advanced, the collar 50 is advanced, and the projection 52 on the collar, coöperating with the projection 46 on the arm 45, swings the arm inwardly, the ends of the projections 46 and 52 being in engagement. When the arm 45 is swung inwardly, the shaft 41 (Fig. 8) is rocked in the frame 40 and the arms 43, through the medium of the projections 44, move the clutch member 24 to the left (Fig. 3), thereby disengaging the clutch elements 19 and 16, and coupling up the clutch elements 24 and 30, in the manner hereinbefore described. When the clutch elements 16 and 19 are disengaged, the spring 21 reacts on the shaft 9 to drive the ground wheels 6, the driving train from the spring 21 to the shaft 9 including the connection 22, the disk 20, the flange 18, the sleeve 17, the clutch member 24 and the clutch member 30, it being observed that during this operation, the spring 28 holds the friction disks 26 and 23 together so that the disk 20 of the sleeve 17 and the disk 25 of the clutch member 24 rotate as one piece. When the clutch member 24 is slid to the left (Fig. 3), the sleeve 17 moves to the left also, the clutch parts 19 and 16 becoming disengaged, the clutch members 24 and 30 becoming interengaged, and the connecting pin 22 sliding endwise through the inner end of the spring 21.

The numerals 69, 70 and 71 denote spring casings like the casing 11, and these casings are provided with mechanisms duplicating those described hereinbefore in detail in connection with the casing 11. At this point it may be noted that the casing 71 is provided with a bearing 72 which, like the bearing 48 constitutes a slidable mounting for the rod 49, the rod 49 being splined at 73 into the bearing 72, so that the rod cannot rotate. The numerals 74, 75 and 76 indicate arms which are individual, respectively, to the casings 69, 70 and 71, and are constructed like the arm 45 on the upper end of the shaft 41 of Fig. 8 and hereinbefore described in detail in connection with the casing 11. The numerals 77, 78 and 79 indicate collars fixed adjustably to the rod 49, like the collar 50, and individual, respectively, to the arms 74, 75 and 76.

The numeral 80 denotes a shaft mounted for rocking movement in the bearings 48 and 72. Secured to the shaft 80 are arms 81 provided with sockets 82. In the sockets 82 latches 83 are mounted for right line sliding movement, the latches being urged outwardly by springs 84 in the sockets, the latches having shoulders 85 coöperating with projections 86 in the sockets, to limit the outward movement of the latches. One of the arms 81 may be provided, as shown in Fig. 6, with a finger 87, coöperating with a projection 88 on the bearing 72, to limit the rotation of the shaft 80 in one direction. The upper ends of the latches 83 operate between the respective arms 45, 74, 75 and 76, and are adapted to be engaged in front of the said arms, in a manner which will be set forth hereinafter. An arm 89 projects inwardly from the rear end of the shaft 80 and is connected by a link 90 to a bell crank 91 (Fig. 4) fulcrumed on the standard 92 carried by the dash board 3. A plunger 93 is pivoted to the bell crank 91 and slides in a casing 94 carried by the dash board, the plunger 93 having an exposed end 95. The plunger 93 has circumscribing seats 96 and 97 adapted to be engaged by a latch 98 mounted in the casing 94 and advanced by a spring 99.

Suppose that the spring 21 has exhausted its force as a means for driving the shaft 9. Then the rod 49 is advanced by the lever 54 until the projection 52 on the collar 50 slides off the projection 46 on the arm 45 and lies in front of the arm. By this operation, the parts will be caused to resume the positions of Fig. 3, the clutch members 30 and 24 being out of engagement, and the shaft 9 rotating in the hub 14 and in the sleeve 17. When the rod 49 is slid forwardly as aforesaid, the collar 77, coöperating with the arm 74, couples up the spring in the casing 69, and this spring now drives the shaft 9. Similarly, the spring in the casing 70, and the spring in the casing 71, one after another, may be made effective to drive the shaft 9, as the springs at the rear, one after another, become exhausted.

Suppose, however, that the spring 21 in the casing 11 has not become exhausted, and that it is desired to supplement the action of this spring by the action of one or more of the springs in the casings 69, 70 and 71. Then, while the arm 45 is swung inwardly, and while the end of the projection 46 of the arm 45 is engaged with the end of the projection 52 on the collar 50, the shaft 80 is rotated by means of the arm 89, the link 90, the bell crank 91 and the plunger 93, the plunger being retracted by means of its end 95, until the latch 98 engages in the seat 96. By this operation, the latch 83 which is individual to the arm 45 will coöperate with the outer edge of the said arm, and hold the same inwardly, thereby preventing the arm from swinging outwardly, and disengaging the clutches 24 and 30, when the rod 49 and the sleeve 50 are advanced, as described, until the projection 52 on the sleeve 50 lies in front of the projection 46 on the arm 45. When the shaft 80 is rotated as aforesaid, that particular latch 83 which is individual to the arm 74, will engage beneath the arm 74, the movement of the said latch in the corresponding socket 82 being possible, owing to the presence of the spring 84. The operator can now couple up the spring which is individual to the casing 69, by means of the collar 77 and, similarly, through the coöperation of the collar 78 and the arm 75, he can couple up the spring which is individual to the casing 70, and finally, the spring which is individual to the casing 71 may be coupled up, due to the coöperation between the collar 79 and the arm 76. During this operation, the latches 83, one after another, engage the outer edges of the arms 74, 75 and 76 as each spring in advance is coupled to the shaft 9, and prevent a disengagement of the respective clutch elements, corresponding to the parts 30 and 24. Thus, the operator has at his command, not only the spring 21, but, as well, the springs in the casings 69, 70 and 71, one or more of which may be coupled up, to aid the spring 21.

When the occasion for increased driving power has passed, the operator rotates the shaft 80 by means of the arm 89, the link 90, the bell crank 91 and the plunger 93, the latch 98 being engaged in the seat 97, thus swinging all of the latches 83 downwardly, away from the respective arms 45, 74, 75 and 76. The rod 49 may then be pulled rearwardly until the collars 79, 78, 77 and 50 are disposed with respect to the arms 76, 75, 74 and 45, as delineated in Fig. 2, under which circumstances, the springs 21, alone, will operate to drive the shaft 9.

Having thus described the invention, what is claimed is:—

1. A spring motor including a frame; a single driven shaft journaled on the frame; a plurality of springs individual to said single shaft; means for fixing one end of each spring with respect to the frame; means under the control of an operator and accessible from a point remote from the springs for coupling the springs one after another, with the said single shaft; and mechanism under the control of an operator and accessible from a point remote from the springs for disconnecting an exhausted spring from the said single shaft.

2. A spring motor including a frame; a driven shaft journaled on the frame; a spring; a coupling mechanism including coöperating parts and means for connecting the said parts for relative movement under an excessive strain, each of said parts having a clutch element; a clutch member fixed with respect to the frame and coöperating with one clutch element; a clutch member carried by the shaft and coöperating with the other clutch element; means for securing one end of the spring with respect to the frame; means for attaching the other end of the spring to one of said parts of the coupling mechanism; and means for moving the coupling mechanism to disengage the clutch element of one of said parts from the clutch member which is fixed with respect to the frame, and for moving, at the same time, the clutch element of the other of said parts into engagement with the clutch member which is carried by the shaft.

3. A spring motor including a frame; a driven shaft journaled on the frame; a spring casing fixed with respect to the frame and provided with a clutch member; a sleeve slidable on the shaft and provided with a clutch element coacting with the clutch member of the casing, the sleeve including a friction disk; a clutch collar movable on the sleeve and including a friction disk coacting with the friction disk of the sleeve; spring means coacting with the clutch collar and with the sleeve to cause the friction disks to coöperate; a clutch member carried by the shaft and coacting with the clutch collar; means for moving the sleeve and the clutch collar together, to disengage the clutch element on the sleeve from the clutch member of the casing, and to engage, at the same time, the clutch collar with the clutch member on the shaft; a spring in the casing and fixed at one end with respect to the casing; and means for connecting the other end of the spring with the sleeve.

4. A spring motor including a frame; a driven shaft journaled on the frame; springs; means for fixing the outer ends of the springs with respect to the frame; clutches uniting the inner ends of the springs with the shaft; mechanism for operating each clutch, to couple the inner ends of the springs with the shaft, each clutch operating mechanism including an arm; separate means under the control of an operator for actuating the arms one after another; and latch mechanisms under the control of an operator and coacting with the arms to cause the clutches to maintain the inner ends of the springs coupled to the shaft after any one of said separate means has moved out of operative relation to the corresponding arm.

5. A spring motor including a frame; a driven shaft journaled on the frame; springs; means for fixing the outer ends of the springs with respect to the frame; clutches uniting the inner ends of the springs with the shaft; mechanism for operating each clutch to couple the inner ends of the springs to the shaft, each clutch operating mechanism including an arm; mechanism under the control of an operator for swinging the arms one after another to couple the springs to the shaft; yieldably mounted latches individual to the arms, the latches yielding with respect to those arms which have not been swung by said mechanism under the control of an operator, and engaging positively with those latches which have been swung by said mechanism under the control of an operator; and mechanism for actuating all of the latches at once to move the latches into engagement with the arms.

6. A spring motor including a frame; a driven shaft journaled on the frame; springs; means for fixing the outer ends of the springs with respect to the frame; clutches uniting the inner ends of the springs with the shaft; mechanisms for operating each clutch to couple the inner ends of the springs to the shaft, each clutch operating mechanism including an arm; a rod slidably supported with respect to the frame; projections on the rod and coöperating with the arms to swing the arms one after another; a second shaft supported for rocking movement with respect to the frame; latches eccentrically carried by the second shaft; and mechanism for supporting the latches yieldingly, the latches being engageable positively with respect to those arms which are actuated by the projections on the rod, and being compressible with respect to the remaining arms.

In testimony that I claim the foregoing as my own, I have hereto affixed my signature in the presence of two witnesses.

TAYLOR J. SIMS.

Witnesses:
J. C. Dunn,
L. C. Ely.

Copies of this patent may be obtained for five cents each, by addressing the "Commissioner of Patents, Washington, D. C."